United States Patent
Brown et al.

(10) Patent No.: US 6,176,808 B1
(45) Date of Patent: Jan. 23, 2001

(54) HYBRID VEHICLE POWERTRAIN AND CONTROL THEREFOR

(75) Inventors: Larry Thomas Brown, Dearborn; Walter Joseph Ortmann, Ypsilanti; Marvin Paul Kraska, Dearborn, all of MI (US)

(73) Assignee: Ford Global Technologies, Inc., Dearborn, MI (US)

( * ) Notice: Under 35 U.S.C. 154(b), the term of this patent shall be extended for 0 days.

(21) Appl. No.: 09/353,290

(22) Filed: Jul. 15, 1999

(51) Int. Cl.$^7$ ........................................... B60K 6/02
(52) U.S. Cl. ................... 477/5; 477/3; 180/65.2; 192/85 AA; 192/86
(58) Field of Search .................. 477/2, 3, 5, 6, 477/906; 74/661; 475/5; 192/85 AA, 86; 180/65.2

(56) References Cited

U.S. PATENT DOCUMENTS

| | | | |
|---|---|---|---|
| 4,938,097 | 7/1990 | Pierce | 475/72 |
| 5,285,111 | * 2/1994 | Sherman | 475/5 X |
| 5,383,825 | 1/1995 | El-Khoury et al. | 477/149 |
| 5,389,046 | 2/1995 | Timte et al. | 475/127 |
| 5,514,047 | 5/1996 | Tibbles et al. | 477/46 |
| 5,755,302 | * 5/1998 | Lutz et al. | 180/65.2 |
| 5,771,478 | * 6/1998 | Tsukamoto et al. | 180/65.2 X |
| 5,801,499 | * 9/1998 | Tsuzuki et al. | 180/65.2 X |
| 5,823,282 | * 10/1998 | Yamaguchi | 477/5 X |
| 5,824,534 | * 12/1998 | Frank | 180/65.2 |
| 6,102,144 | * 8/2000 | Lutz | 180/65.2 |

* cited by examiner

*Primary Examiner*—Charles A Marmor
*Assistant Examiner*—Ankur Parekh
(74) *Attorney, Agent, or Firm*—Frank G. Mckenzie

(57) ABSTRACT

A powertrain assembly for an automotive vehicle having an interanal combustion engine and transmission gearing for delivering engine torque to traction wheels of a vehicle. An electric induction motor is situated in the torque flow path between the engine and the transmission. The induction motor complements engine torque which permits the engine to be turned off when the vehicle is at rest, thereby improving fuel economy and rendering undesirable exhaust gas emissions from the internal combustion engine. The torque multiplication that would normally be available from a hydrokinetic torque converter in the transmission is essentially replaced with auxiliary launch torque supplied by the induction motor during vehicle startup. The vibration damping function of a hydrokinetic torque converter during engine idle is also performed by the induction motor. Therefore, a hydrokinetic torque converter in the transmission in not necessary. The induction motor, during those operating modes of the vehicle when induction motor torque is not required to deliver driving torque, functions as an alternator during periods of regenerative braking with the internal combustion engine inactive and with the vehicle in a coast mode.

10 Claims, 14 Drawing Sheets

| GEAR | RC | FC | DC | L.R | 2.4 | RATIO |
|------|----|----|----|-----|-----|-------|
| 1ST  |    | X  |    | X   |     | 2.889 |
| 2ND  |    | X  |    |     | X   | 1.571 |
| 3RD  |    | X  | X  |     |     | 1.000 |
| 4TH  |    |    | X  |     | X   | 0.698 |
| REV  | X  |    |    | X   |     | 2.310 |

X = ELEMENT TRANSMITS TORQUE

HYBRID VEHICLE POWERTRAIN AND CONTROL THEREFOR

TECHNICAL FIELD

The invention relates to hybrid vehicle drivelines with an internal combustion engine and an electric motor providing torque input to transmission gearing.

BACKGROUND OF THE INVENTION

In a typical automotive vehicle driveline, it is common practice to include a hydrokinetic torque converter. The impeller of the torque converter receives engine torque and the turbine of the torque converter transfers torque to the torque input element of multiple-ratio gearing of the transmission.

The presence of the torque converter in the torque flow path introduces hydrokinetic power losses, particularly during startup of the vehicle, as the torque converter fluid in the converter torus circuit is accelerated and decelerated. These losses are manifested in heat loss to the hydrokinetic fluid, which requires a heat exchanger to maintain an acceptable hydrokinetic fluid temperature.

Attempts have been made to eliminate the power losses inherent in a powertrain having an internal combustion engine and a torque converter automatic transmission by replacing the engine with an electric motor, the power output element of the motor being connected to the torque input element of the transmission. Such driveline arrangements, however, do not take advantage of the superior performance of an internal combustion engine in an automotive vehicle. Further, they require the presence of an on-board electric voltage source.

Attempts to combine the advantages of an internal combustion engine with an electric motor drive have been made in hybrid vehicle arrangements, but the engine is required in such known designs to operate throughout a large speed range including startup speeds and to operate at idle speed while the vehicle is at rest.

BRIEF DESCRIPTION OF THE INVENTION

The transmission and control system of the invention is particularly adapted for use with a hybrid electric vehicle including an internal combustion engine and a multiple-ratio transmission gearing arrangement wherein provision is made for significantly improving fuel economy and reducing undesirable exhaust gas emissions from the engine.

It is an objective to provide an improved hybrid electric vehicle transmission and control system which would permit the internal combustion engine to be deactivated when the vehicle is at rest. The improved driveline of the invention includes an induction motor that is useful to provide added launch performance, which permits the multiple-ratio transmission to operate throughout a desired ratio range without the necessity for using a hydrokinetic torque converter between the engine and the input element of the transmission gearing.

It is also an objective of the invention to use an induction motor in a hybrid vehicle driveline, when the motor is not required for rapid vehicle startup, to function as an alternator.

The absence of a hydrokinetic torque converter from the hybrid electric vehicle driveline of the invention does not result in undesirable torsional vibration since the induction motor situated between the engine and the transmission may function as a vibration damping structure as well as a means for effecting shift quality improvement.

During vehicle coast-down, regenerative braking is achieved by the induction motor, thereby further improving the fuel economy.

The engine idle and launch speed control are provided by modulating the forward clutch engagement with a closed-loop electronic controller. The forward clutch may be located in the transmission structure itself or it may be an independent clutch located in the torque flow path between the engine and the input element of the gearing. The clutch, regardless of whether it is an integral element of the transmission gearing or is a stand-alone clutch on the torque output side of the engine, may be used to disconnect the engine from the induction motor during regenerative braking.

The clutch also disconnects the engine from the torque flow path when the engine is required to operate at low throttle and during operation of the vehicle at low speed when only the induction motor may be used to propel the vehicle. It is at this time that the internal combustion engine is most inefficient. Thus, by disconnecting the engine, the engine may be reserved for operation in the speed range at which it is most efficient as the induction motor supplies the driving torque.

The clutch may be used also to rapidly restart the engine when the vehicle is moving by using the vehicle momentum since the engine is connected mechanically through the clutch to the gearing.

The torque output of the induction motor can be optimized by maintaining the engine speed at a lower level than that which would be the case with a conventional automatic transmission with a torque converter. The launch performance is improved compared to a driveline with a converter transmission since the output torque at the traction wheels increases more rapidly during launch of the vehicle when the electric motor is used for launch purposes.

The presence of the induction motor in the driveline makes it possible to improve shift quality during a speed ratio upshift. For example, it is necessary during an upshift to disengage one friction element as the other is engaged. Torque builds up in one friction element during a so-called torque phase, which occurs at the beginning of the upshift. Normally, line pressure is increased quickly at the beginning of the torque phase in order to reduce the time interval required to accomplish a shift. Just prior to the completion of the torque phase, the line pressure is reduced so that the subsequent inertia phase of the shift can be initiated. The inertia phase is accompanied by a change in the rotary speed of rotating elements as the oncoming clutch becomes activated.

In order to reduce the so-called "torque hole" that occurs during the torque phase of an upshift prior to the initiation of the inertia phase, the induction motor can be used to supply a temporary torque boost so that the net torque at the traction wheels remains relatively constant. This improves shift quality.

When the vehicle is at rest and the engine is shut down, it is necessary to have the forward clutches in the transmission applied. On launch, the operator moves the throttle to the advanced position. The launch torque of the electric motor then moves the vehicle, thereby permitting the engine to be restarted. This procedure makes it necessary for the forward clutches to be applied. This is accomplished in the driveline of the present invention by using an auxiliary electric pump system to provide a threshold pressure to the transmission clutches when the engine is inactive. As hydraulic pressure increases following restarting of the engine, the pump is turned off.

The invention further comprises a clutch on the torque output side of the engine. It is normally applied with a spring force so that, on engine startup, hydraulic flow at the output of the transmission pump is reduced. The clutch need not be stroked before it is pressurized.

PARTICULAR DESCRIPTION OF THE INVENTION

Figure 1:
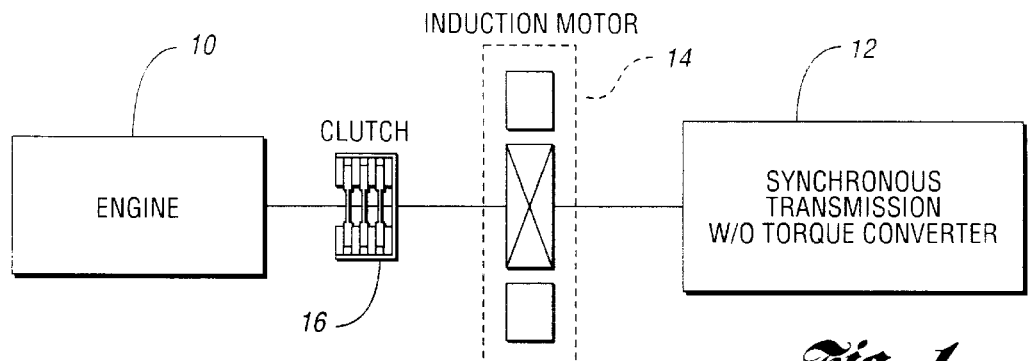
FIG. 1 is a schematic representation of the overall vehicle driveline including the engine, the electric induction motor, a controllable clutch between the engine and induction motor for disconnecting the engine, and a synchronous automatic transmission without a torque converter.

FIG. 1 shows a first embodiment of the hybrid vehicle driveline. It comprises an internal combustion engine 10, a synchronous, multiple-ratio vehicle transmission 12, an induction motor 14 situated between the engine and transmission 12, and a friction clutch 16 situated between the engine and the induction motor to disconnect the engine. The rotor of the induction motor is connected directly to the torque input element of the multiple-ratio synchronous transmission. It is connected also to the engine crankshaft 10 through the friction clutch 16.

Figure 2:
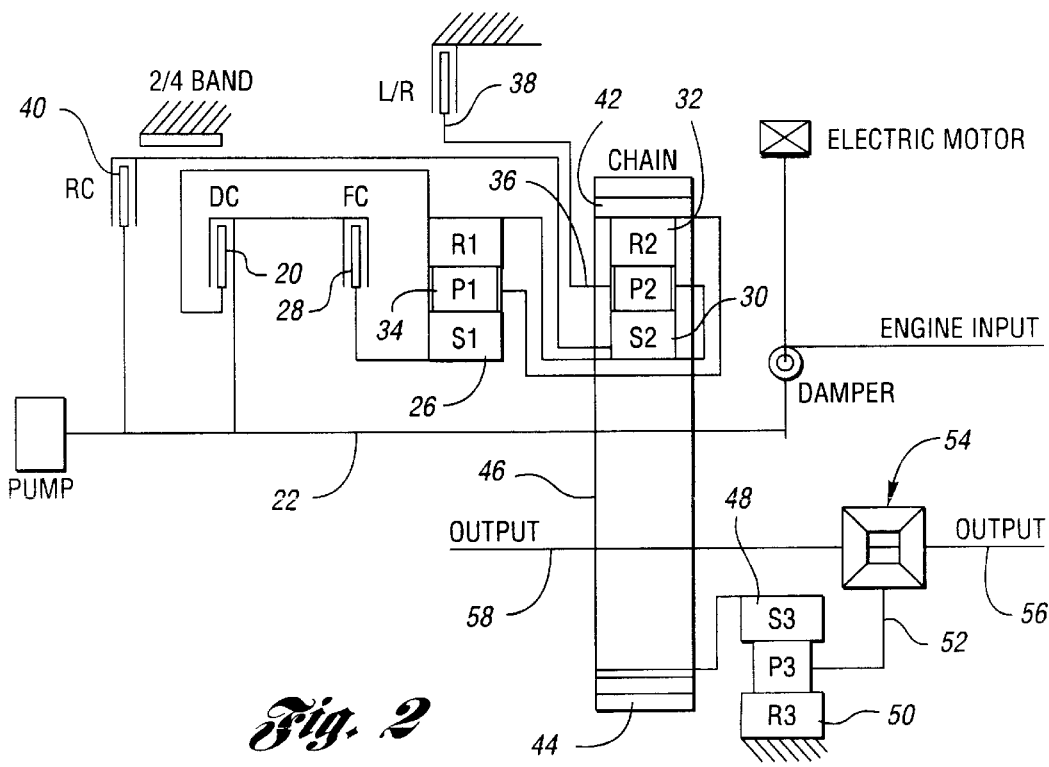
FIG. 2 is a schematic diagram showing the gearing elements of the synchronous transmission illustrated in block diagram form in FIG. 1.

FIG. 2 is a schematic representation of the gearing elements for the synchronous transmission shown at 12 in FIG. 1.

The torque shaft for the transmission is connected to the torque input side of the clutch 16. The electric motor is arranged so that it distributes torque in parallel relationship with respect to the engine torque input.

The direct clutch (DC) shown at 20 connects transmission input shaft 22 to the ring gear 24 of a first simple planetary gear unit. Sun gear 26 of the simple planetary gear unit is connected through a forward clutch (FC) shown at 28 to the shaft 22. Ring gear 24 is connected to sun gear 30 of a second planetary gear unit. The ring gear 32 of the second planetary gear unit is connected to the planetary carrier 34 of the first planetary gear unit. The planetary carrier 36 for the second planetary gear unit is braked selectively by low-and-reverse brake (L/R) 38.

Transmission input shaft 22 is connected through reverse clutch (RC) 40 to the sun gear 30 and is engaged during the first ratio drive operation. The brake 38, during reverse drive operation, anchors planetary carrier 36.

Figures 3, 5:
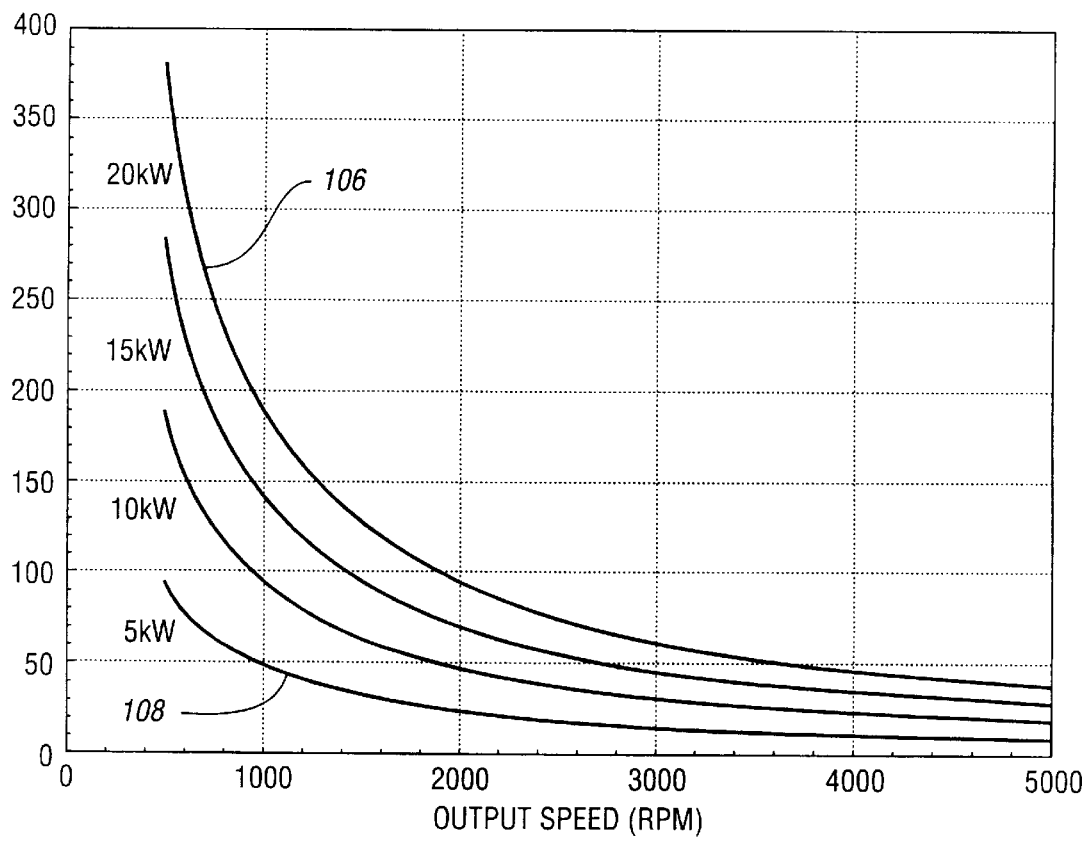
FIG. 3 is a chart showing the engagement and release pattern for the clutches and brakes that form a part of the gearing system illustrated schematically in FIG. 2 and the engagement and release sequences required to effect the driving ratios.
FIG. 5 is a plot of the electric motor assist for various motor speeds for the induction motor that forms a part of the powertrain illustrated schematically in FIG. 1.

FIG. 3 is a chart which illustrates the engagement and release pattern for the clutches and the brakes for the synchronous, multiple-ratio transmission shown schematically in FIG. 2. First gear is achieved by engaging the forward clutch and the low-and-reverse brake. Second forward drive ratio is achieved by engaging the forward clutch and the low-and-reverse brake 38. Direct drive or third drive ratio is achieved by simultaneously engaging the forward clutch and the direct clutch, and fourth ratio or overdrive ratio is achieved by engaging the direct clutch and the low-and-reverse brake 38.

Reverse clutch 40 and low-and-reverse brake 38 are engaged during reverse drive operation.

The ring gear 32 acts as a torque output element for the gearing. It defines a driving sprocket 42, which drives a driven sprocket 44 by means of a drive chain 46.

The driven sprocket drives the sun gear 48 of the final drive gear unit. The ring gear 50 of the final drive gear unit is anchored and the planetary carrier 52 brings torque output to differential gearing 54, which transfers driving torque to each of two axle half shafts 56 and 58.

Figure 2A:
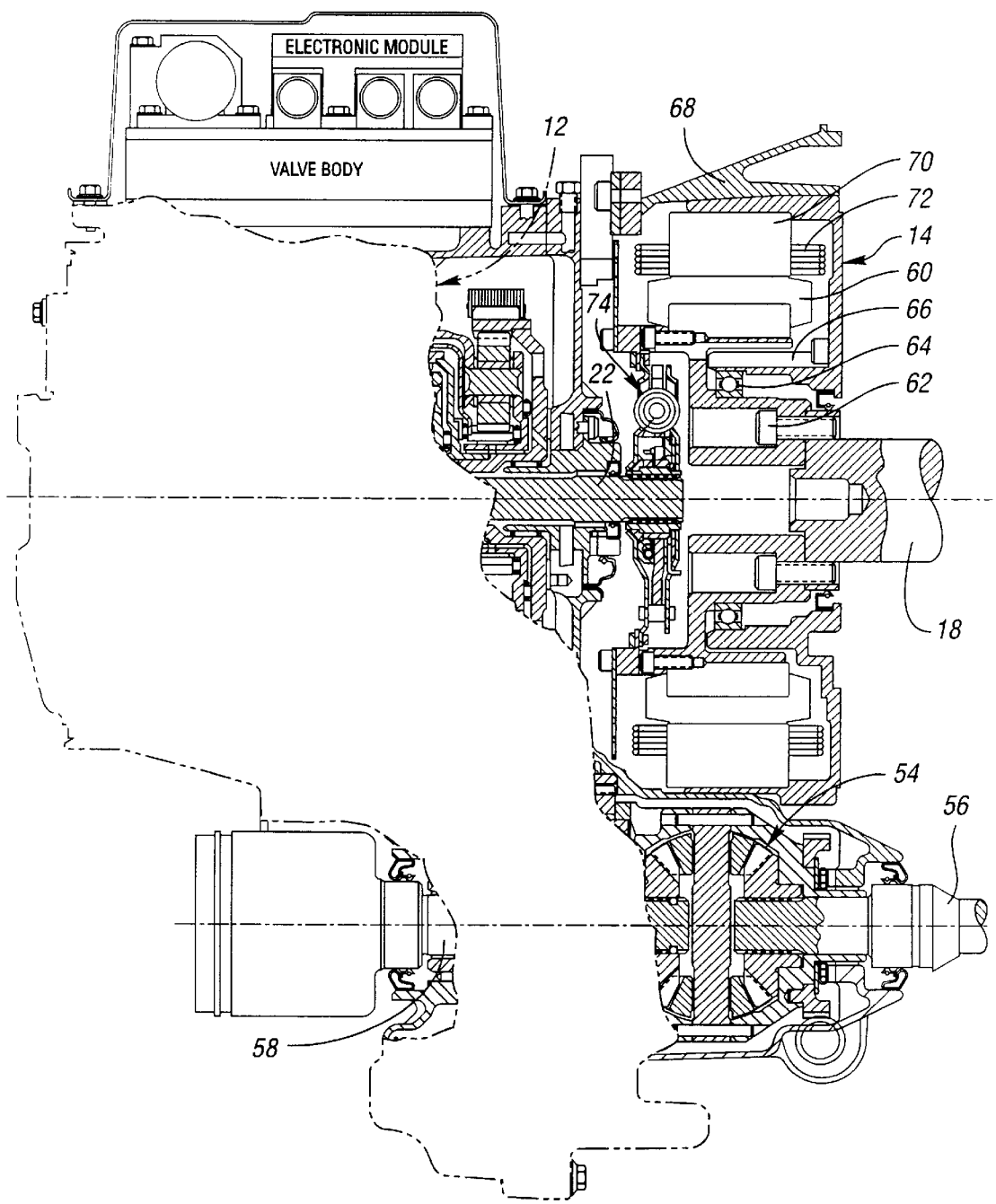
FIG. 2a is a partial assembly view of the transmission structure illustrated schematically in FIG. 2, the elements of the gearing that are illustrated schematically in FIG. 2 being shown in FIG. 2a in phantom outline form.

FIG. 2a is a detailed view of the electric induction motor and its relationship to the automatic transmission 12. The induction motor comprises rotor 60, which is connected directly by means of crankshaft bolts 62 to a flange on the engine output shaft 18. The rotor is journalled by bearing 64 to a bearing support 66, which forms a part of the transmission housing indicated in part at 68.

Surrounding the rotor is an induction motor stator 70, which includes stator windings 72.

The torque output side of the rotor 60 includes a conventional damper 74. The torque output hub of the damper 74 is splined to torque input shaft 22 of the transmission 10.

The clutch 16 seen in FIG. 1 is used to disconnect the engine from the motor during regenerative braking, as mentioned earlier. When clutch 16 is disconnected, the induction motor is the only source of driving torque for the synchronous transmission. The clutch may be disconnected also during low-throttle operating conditions when the induction motor is capable of providing sufficient torque to propel the vehicle. Thus, the most inefficient operating range of the engine can be avoided.

Since the transmission 12 is synchronous, it is capable of delivering coasting torque. The engine, which may be inoperative during low-speed operation, can be rapidly restarted merely by engaging the clutch under coast conditions.

Figure 6:
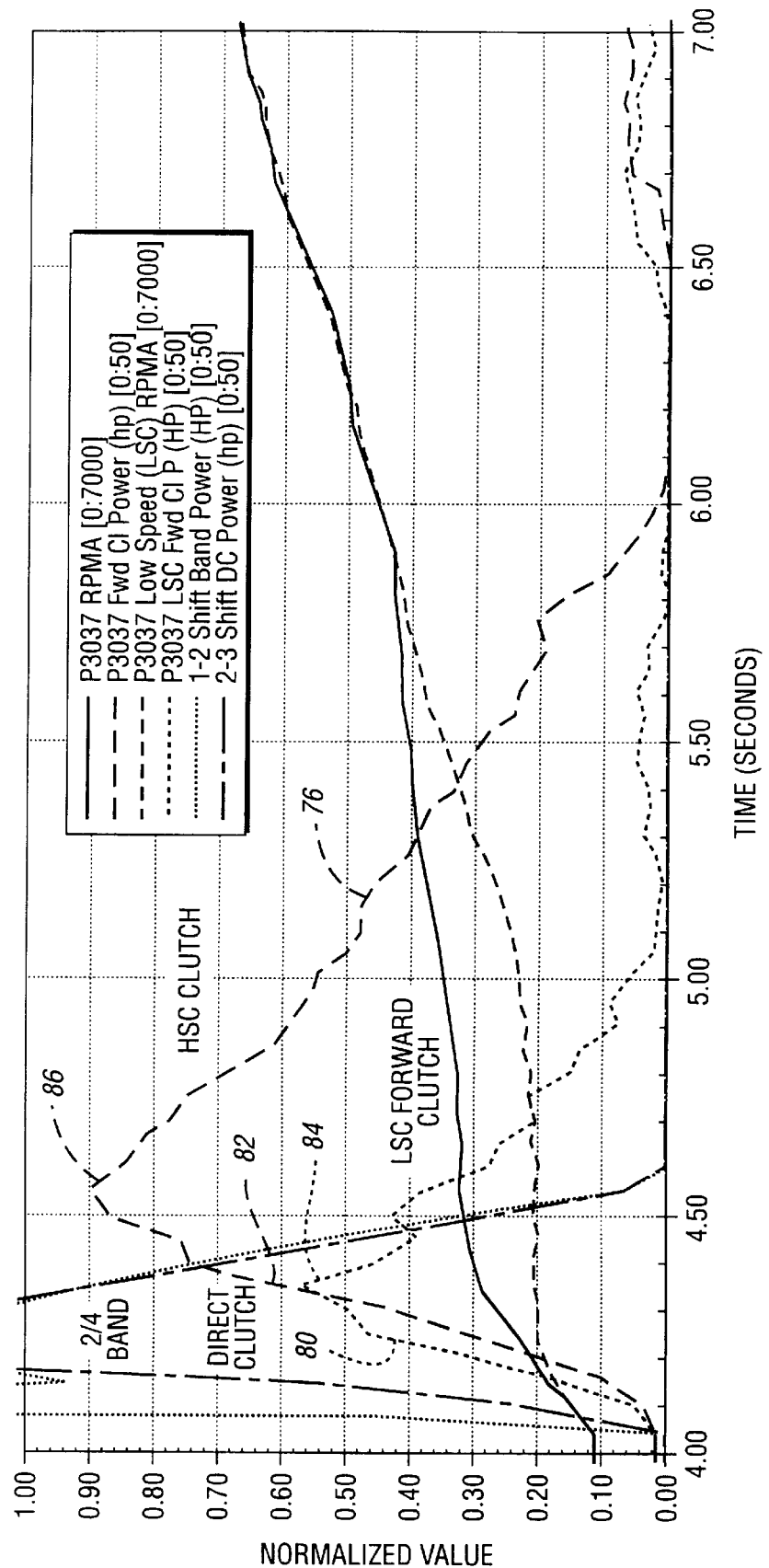
FIG. 6 is a plot of power delivered to the vehicle traction wheels versus clutch engagement time, which demonstrates the energy that is absorbed by the clutch during a high-speed launch and the corresponding energy for a low-speed launch, the engine speed being controlled at a lower value for a low-speed launch for a high-speed launch.

As seen in FIG. 6, it is possible to control the engine at a relatively high speed for a high engine speed launch of the vehicle. This is indicated by curve 76 where the engine is controlled at a normal speed comparable to the speed that would exist if the vehicle were to be equipped only with a synchronous transmission without the torque assist of the motor. A corresponding low-speed launch performance curve is shown at 80 in FIG. 6. It is seen from FIG. 6 that the initial torque developed by performance curve 80 rapidly rises. Torque increase occurs more rapidly than the corresponding torque increase at 82 for the performance curve shown at 76.

Although the peak torque 84 achieved by the performance curve 80 is lower than the peak torque at 86 achieved by the performance curve 76, it is seen that the engagement cycle time for the performance curve 80 is about one second shorter than the engagement time for the performance curve 76. Note, for example, that the performance curve 80 reaches a zero value at about five seconds, whereas the performance curve 76 reaches the zero power level at about six seconds.

The area under the curve 80, which corresponds to the energy absorbed by the clutch, is substantially less than the area under the curve 76. This factor should reduce or eliminate any concerns that may exist with respect to the ability of the clutch to absorb energy during the clutch engagement cycle while meeting the durability requirements required of an automotive vehicle transmission.

Figure 4:
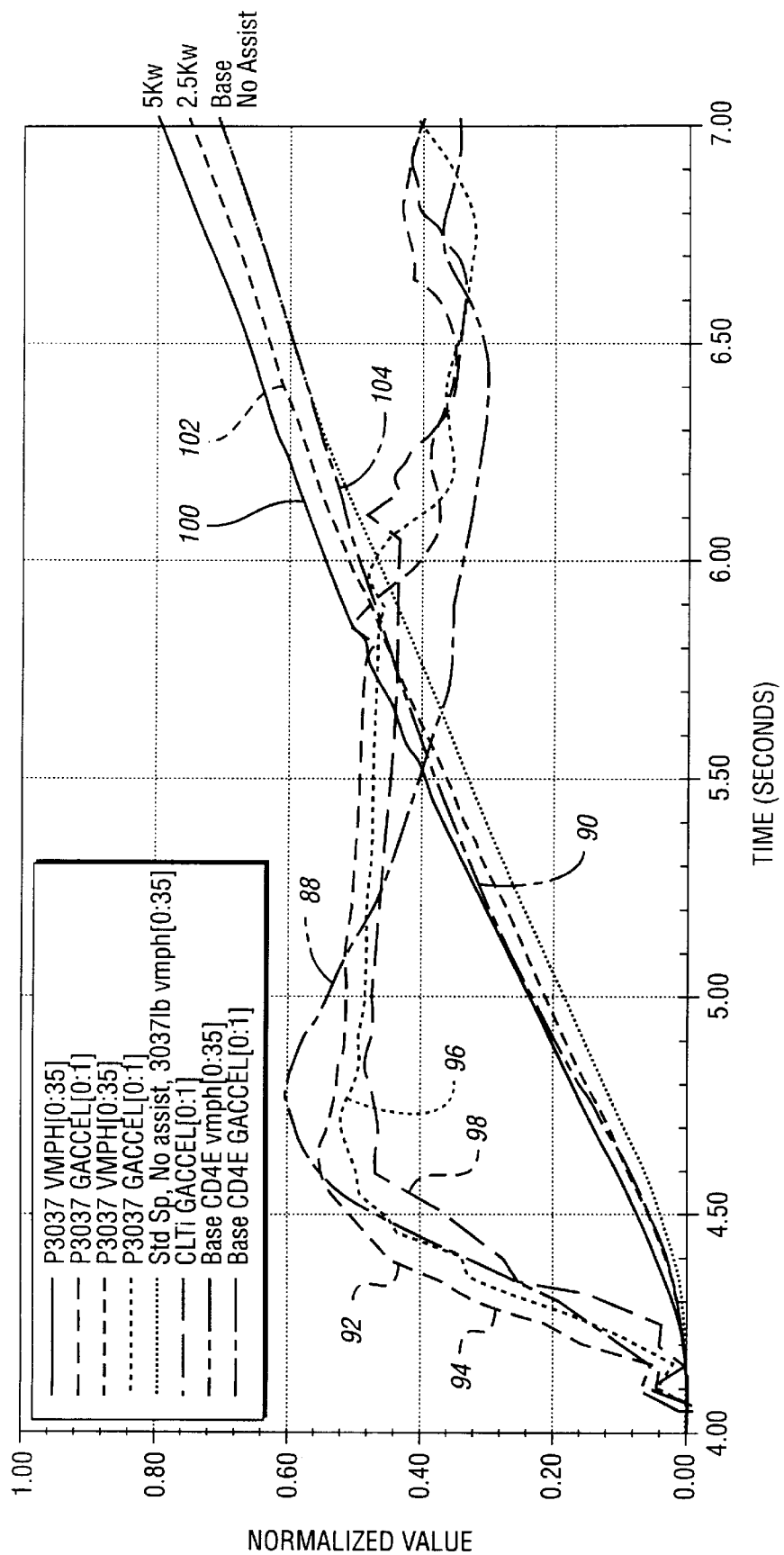
FIG. 4 is a plot of the torque at the wheels of the vehicle for the hybrid powertrain of the invention as well as a corresponding performance chart for a hydrokinetic torque converter transmission driveline, which is superimposed on the performance chart for the powertrain of the invention for purposes of comparison.

FIG. 4 shows that it is possible to optimize the output torque of the electric motor while maintaining a reduced engine control speed. The engine control speed may be lower than that which is required with a torque converter transmission while providing improved launch performance. Reduced noise vibration and harshness (NVH) is another advantage. Engine noise is reduced at lower engine speed.

Engine torsional damping and shift quality improvement are provided by the induction motor by reason of its high bandwidth characteristic. This is another advantage of the hybrid vehicle driveline of the type shown in FIG. 1. The natural torque reduction or torque hole that occurs at the end of the torque phase of a transmission ratio shift and at the beginning of the inertia phase during an upshift can be reduced or eliminated by increasing the motor torque during the shift interval.

If the engine is shut down and the vehicle is operating with only the induction motor as a torque source, advancement of the engine throttle is required to restart the engine. This requires the transmission to have its clutches engaged rapidly in order to carry torque without slippage. This feature is accomplished by the use of a small electric pump, which will be described subsequently with reference to FIGS. 8–11. The electric pump will supply sufficient pressure (e.g., 40 psi) to the clutches when the engine is off. The pump is turned off as hydraulic pressure is reestablished by the transmission pump when the engine is started.

A normally stroked clutch piston feature may also be used so that when transmission hydraulic flow occurs following engine startup, the clutches are activated immediately. A clutch apply spring supplies a threshold torque to the clutch and eliminates the need to stroke the clutch piston. This will be described with reference to FIG. 12.

FIG. 4 shows a plot of the normalized power value versus the time of engagement of the clutch. Plot 88 is a performance curve for a multiple ratio torque converter transmission without the torque assist of the electric motor. The ordinate of the plot of FIG. 4 may be considered to be an indicator of acceleration torque as well as power.

The vehicle speed corresponding to plot 88 is indicated in FIG. 4 at 90. For purposes of comparison of the hybrid vehicle driveline with the base design in which no electric motor assist is used, the performance plots of FIG. 4 include performance curve 92 where a five kilowatt power assist is used in a driveline of the kind shown in FIG. 1. This produces a rapidly rapid rising power curve as shown at 94. The corresponding plots for a 2.5 kW motor is indicated at 96 in FIG. 4.

Shown in FIG. 4 is a plot indicated at 98 which corresponds to zero torque assist by the induction motor. It is only slightly lower than the corresponding plots shown at 92 and 96. The plots for torque assist performance in FIG. 4 flatten out after reaching a peak between 4.5 seconds and 6 seconds of the shift interval. The corresponding plot for vehicle speed with a 5 kw motor torque assist is shown at 100. The corresponding plot for the 2.5 kw motor torque assist is shown at 102. These vehicle speed plots are not substantially different than the plot for the base vehicle speed plot 104 for a driveline with no motor torque assist.

Although the peak torque that would be achieved using the hybrid electric vehicle driveline of FIG. 4 is lower than the corresponding peak torque that would be achieved using a conventional multiple-ratio, synchronous transmission without an induction motor, the presence of the induction motor in the driveline of the hydroelectric vehicle results in a faster rising power curve at the beginning of the clutch engagement interval. Further, the acceleration torque and power available using a 2.5 kw assist or a 5 kw assist is greater than the acceleration torque or power that would be available with a conventional multiple-ratio transmission in the interval of the shift between five seconds and 6.5 seconds.

The speed-torque characteristic of an induction motor of the kind shown in FIG. 1 and in FIG. 2*a* is shown in FIG. 5. A high kw motor produces a higher torque, as would be expected as indicated at 106, especially at low speeds. The lowest kw motor, which may be 5 kw, produces a curve as shown at 108. The value of the torque falls rapidly as the output speed of the motor increases. At higher speeds (e.g., speeds in the range of 2000–4000 rpm), the difference between the torque made available by a high kw motor and by a low kw motor are not as significant.

Figure 7:
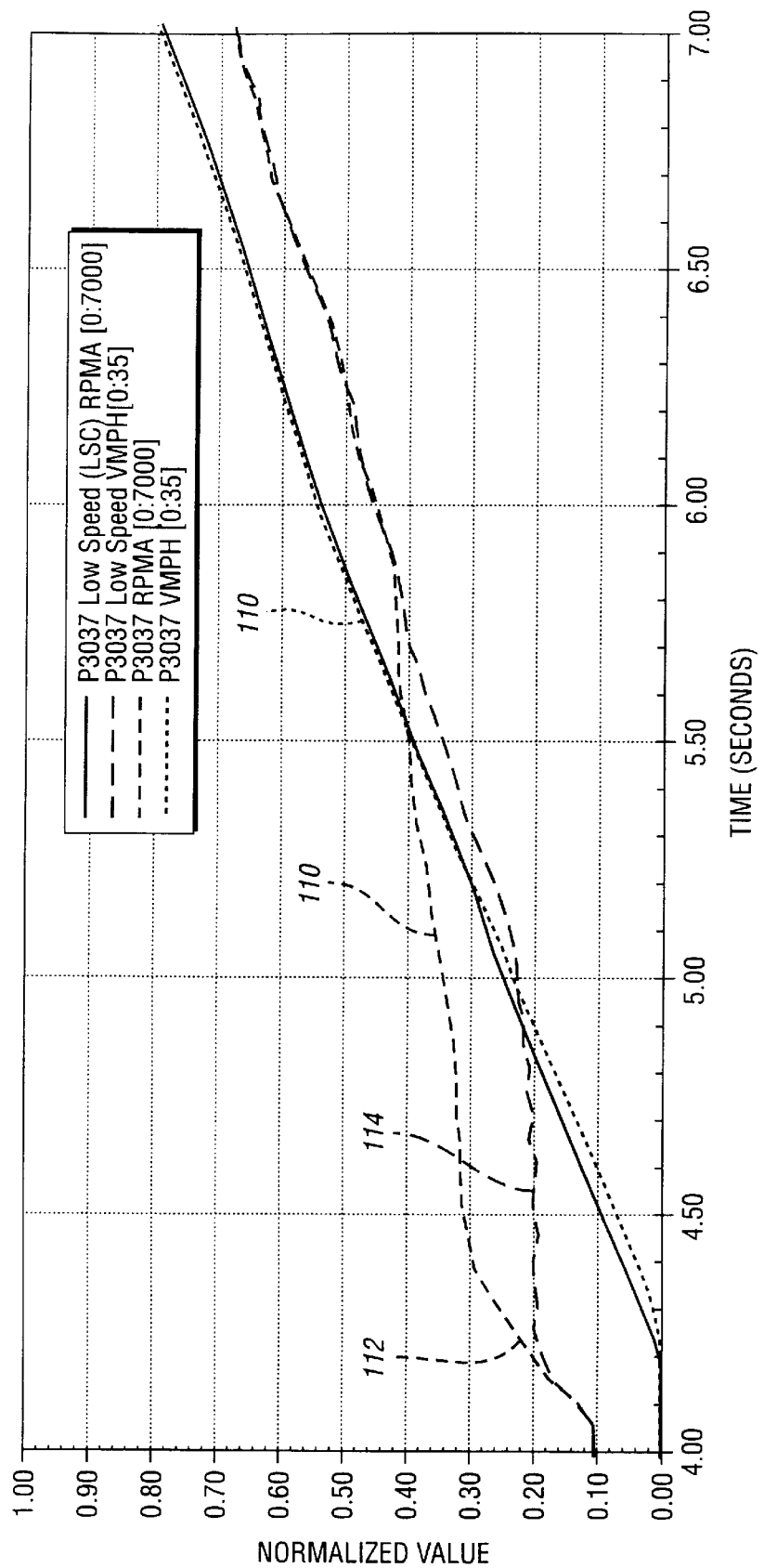
FIG. 7 is a plot of power versus time during vehicle launch showing the vehicle speed versus power when the engine is controlled at 2200 rpm and when the engine is controlled at 1500 rpm.

FIG. 7 shows a plot of a hybrid vehicle weighing 3037 lbs. with an engine speed controller in combination with a 5 kw motor assist. Performance curve 110 shows the plot for a driveline in which the engine speed is controlled at 2200 rpm. The power available at the wheels rises rapidly, as shown at 112. When the engine is controlled at a lower speed, (e.g., 1500 rpm), the corresponding plot is represented by the curve 114.

Vehicle speed increases at a relatively uniform rate, which is substantially linear as indicated at 116, regardless of whether the engine is controlled at the low speed of 1500 rpm or at the higher speed of 2200 rpm. In each of the plots of FIG. 7, the motor provides a 5 kw assist.

Figure 1A:
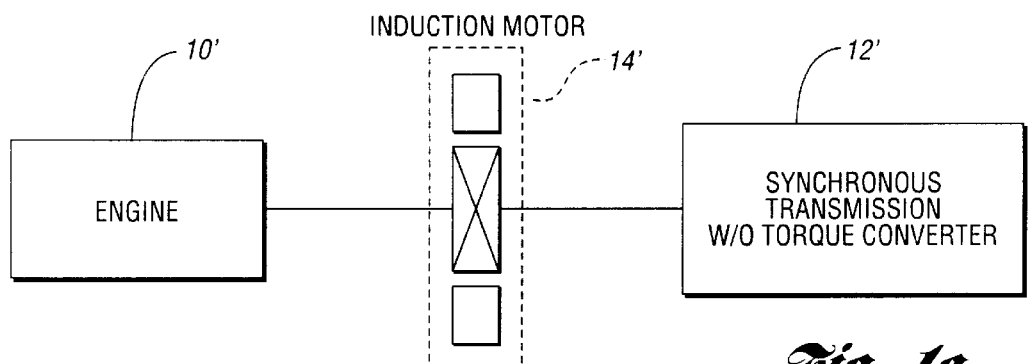
FIG. 1a is a schematic representation of the driveline of FIG. 1 but which does not have an engine-disconnect clutch as in the case of FIG. 1.

FIG. 1a shows a hybrid vehicle transmission and engine configuration without a separate clutch. A forward clutch of the synchronous transmission 12', as in the case of the embodiment of FIG. 1, may be used to establish and disestablish a torque flow path between the engine and the transmission gearing. The induction motor 14' of FIG. 1a corresponds to the induction motor 14 of FIG. 1, and the engine 10' corresponds to the engine 10 of FIG. 1.

As in the case of the configuration of FIG. 1, the configuration of FIG. 1a makes it possible to eliminate the torque converter of the synchronous transmission together with its inefficiencies. Engine idle and launch speed control are provided by modulating the forward clutch with a PID closed-loop controller in the same manner as will be described with reference to the clutch controller for FIG. 1 shown in FIG. 14, which will be described subsequently.

As in the case of the configuration of FIG. 1, the induction motor in the configuration of FIG. 1a is used to improve launch performance in the absence of a converter in the transmission. This provides a fast-acting torque assist while the engine torque is building at low engine speeds. As in the case of the configuration of FIG. 1 previously described, the engine control speed can be maintained at a lower level than would be the case if the synchronous transmission were to be used in a conventional driveline.

Figure 15:
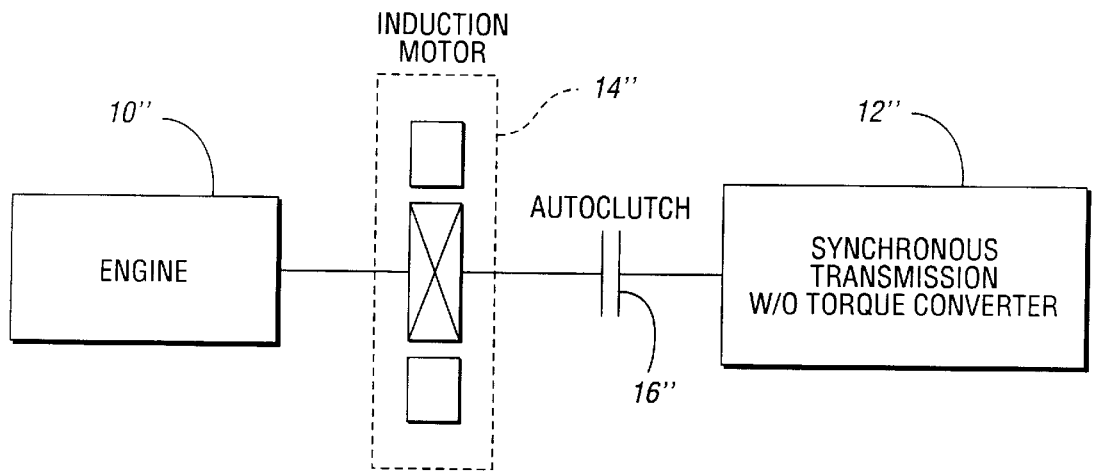
FIG. 15 shows a modification of the invention wherein a driver-controlled clutch is used between the induction motor and a multiple-ratio synchronous transmission without a torque converter.

FIG. 15 is still another embodiment of the invention. The hybrid vehicle driveline of FIG. 15 uses an electronically controlled clutch rather than a hydraulically actuated friction clutch of the kind shown at 16 in FIG. 1. The clutch of the embodiment of FIG. 16, identified by reference numeral 15", is located between the induction motor 14" and the transmission 12".

The clutch 16" may be a manual clutch that is electronically controlled. It is used in place of a torque converter in the transmission 12" to provide a positive connection during the coasting mode if regenerative braking is desired. It essentially has the same advantages from a performance standpoint that are achieved using the hybrid vehicle driveline configurations of FIG. 1.

Figure 16:
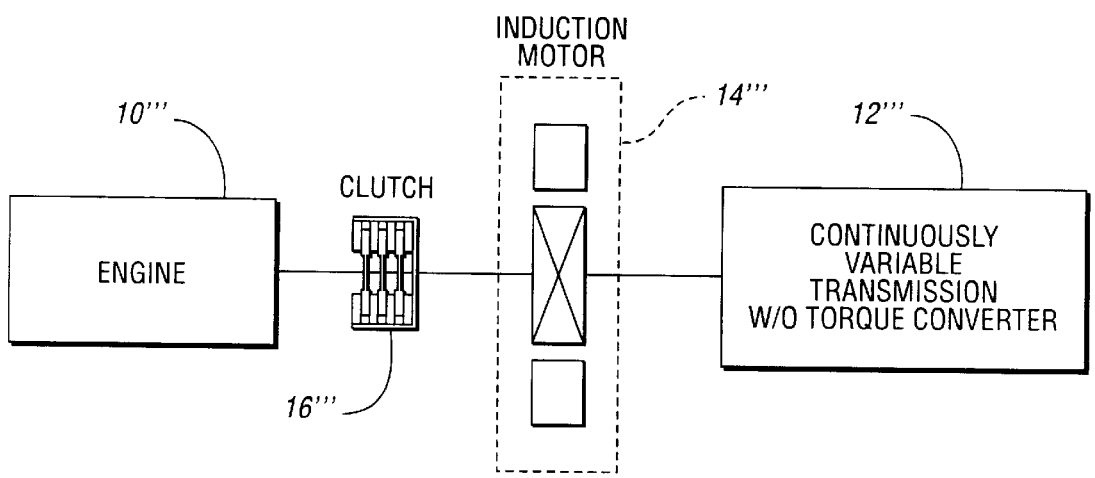
FIG. 16 is a schematic representation of another embodiment of the invention wherein a friction clutch is situated between the engine and the induction motor in a hybrid vehicle driveline and wherein the driveline comprises a continuously variable transmission without a torque converter.

The hybrid vehicle driveline configuration of FIG. 16 has the same basic elements as the driveline configuration of FIG. 1 except that the transmission 12''' is a continuously variable transmission rather than a synchronous geared transmission. The induction motor 14''', the clutch 16''' and the engine 10''' have corresponding elements in the driveline configuration of FIG. 1.

The continuously variable transmission of FIG. 16 may be any of a variety of known designs such as a belt drive transmission with variable pitch diameter sheaves of the kind shown, for example, in U.S. Pat. No. 5,514,047, issued to Thomas T. Tibbles and Pramod K. Jain. That patent is assigned to the assignee of the present invention. The disclosure of that patent is incorporated herein by reference.

The hydraulic control valve system for controlling the continuously variable transmission of FIG. 16 will be described subsequently with reference to FIG. 16.

Figures 12, 13:
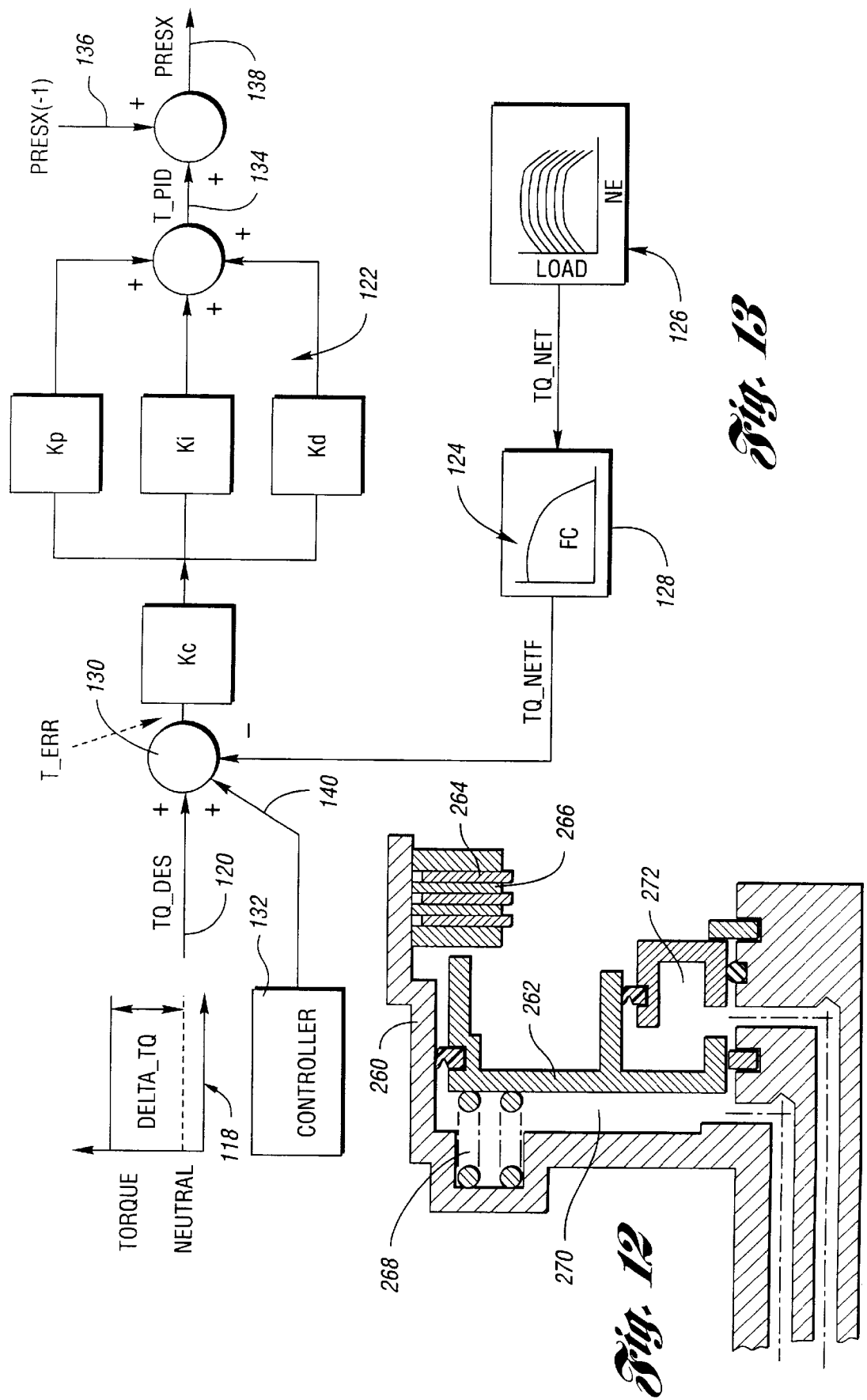
FIG. 12 is a schematic representation of a normally stroked clutch in a multiple-ratio transmission for a hydro-electric vehicle.
FIG. 13 is a schematic system diagram showing an engine idle controller for an engine in a hybrid vehicle.
Figure 14:
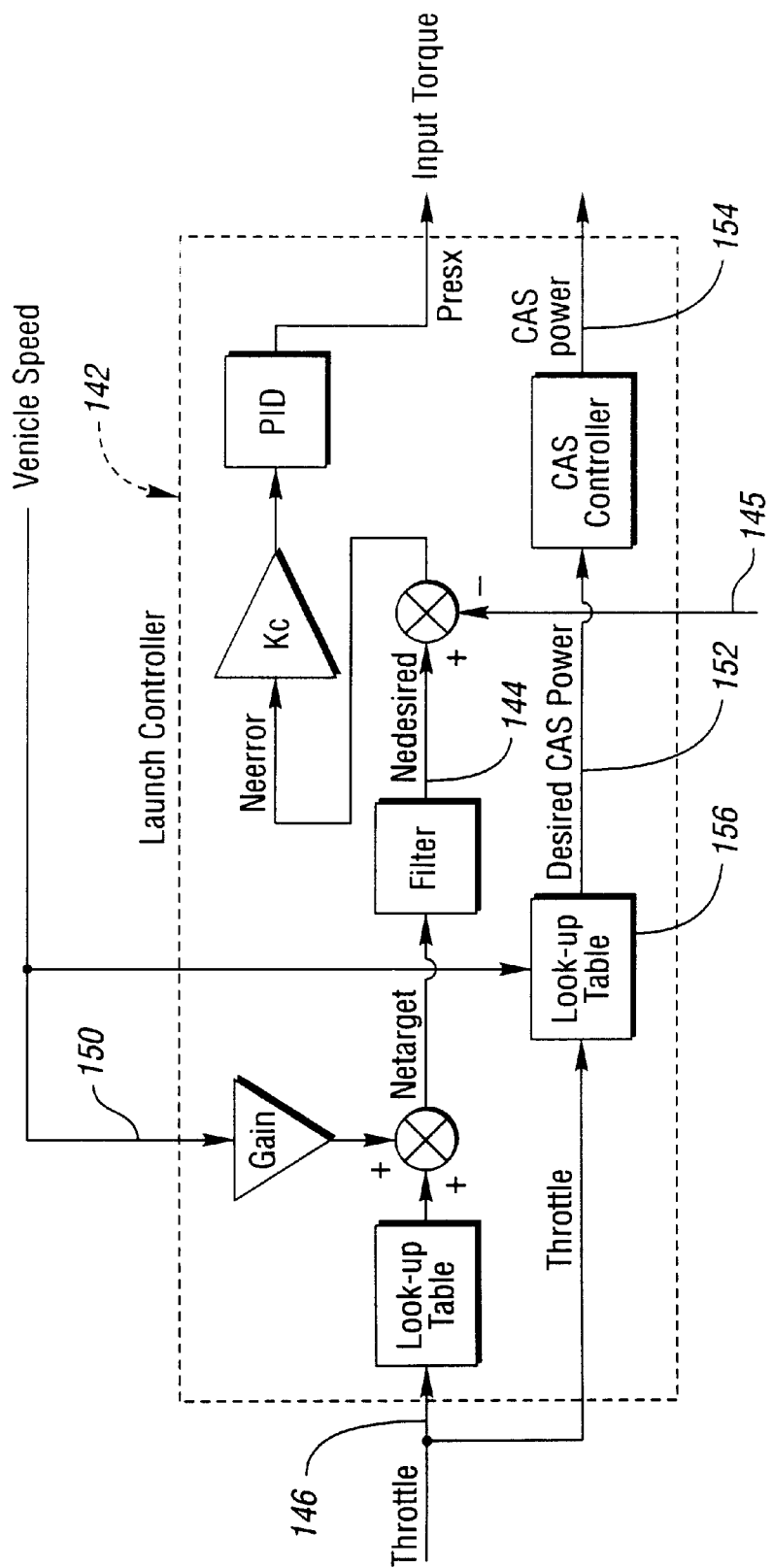
FIG. 14 is a schematic controller in block diagram form for a converterless hybrid vehicle during launch.

The engine idle and launch controller is illustrated schematically in FIGS. 13 and 14. When the vehicle is being restarted and during operation of the engine under idle conditions with the vehicle at rest, an idle controller with electronic damping is used. This will be described with reference to FIG. 13.

The controller maintains a small delta torque as indicated by the speed torque plot at 118 of FIG. 13. This is an offset from the average engine idle torque. It is used as a set point torque, as shown at 120. The offset is maintained by the closed-loop modulation provided by a PID circuit and feedback circuit portion 124. The feedback torque in circuit portion 124 is inferred from an engine map 126. A low-pass filter 128 is used to account for dynamic effects. The feedback torque is supplied to summing point 130.

The electric motor torque, which is referred to in FIG. 13 as an alternator/starter torque, is represented by block 132. Alternator/starter torque is fed to the summing point 130 as a plus torque as shown at 140.

The microprocessor of the transmission will compare the feedback torque in feedback circuit portion 124 with the sum of the combined alternator/starter torque and the engine torque. If there is an error, a signal is sent to the PID circuit shown at 122. Incremental, proportional and differential terms cause a change in the command of pressure shown at 134 which, when added to the previous commanded pressure at 136 in the immediately preceding control loop of the processor, results in a net commanded pressure PRESX, as shown at 138. The pressure corresponding to this commanded pressure then will be applied to the clutch.

The hybrid electric vehicle driveline will produce significantly reduced engine inertia. Thus, engine idle torque variations may be larger. The combined alternator/starter, however, will provide extra damping by returning a portion of the combustion torque during compression. This is depicted in the diagram of FIG. 13.

When the vehicle driveline controller signals a launch, the launch controller shown in FIG. 14 becomes activated. This supercedes the engine idle controller described with reference to FIG. 13 to provide a smooth takeover. The schematic diagram of FIG. 14 includes an electronic controller shown at 142.

The closed-loop controller is an incremental, proportional, integral and derivative controller similar to the controller of FIG. 13, but it has gains that are a function of engine and vehicle speeds. The set point for the controller, which is designated as NEDESIRED at 144, is a filtered target speed (NETARGET) based on the driver throttle demand at 146 and the vehicle speed. The vehicle speed signal is supplied through signal flow path 150.

The PID controller uses a proportional control feature which makes it possible for the output of the controller to be varied directly with the error signal. This produces a gain factor, which is a measure of the control gain in the system, and reduces the magnitude of any current errors (i.e., errors between desired engine speed at 144 and the actual feedback engine speed at 145). Proportional control, by itself, of necessity establishes a gain factor of limited range. It may not be sufficient to achieve the desired response due to steady-state error. The integral component of the PID controller, therefore, eliminates steady-state error for improved system accuracy. The response can further be improved to effect system stability and efficient transient response of the system by introducing derivative control. This establishes a stabilizing effect on the system because of the phase lead in the control loop.

The alternator/starter controller is requested to provide additional power by means of signal flow path 152 to assist in the launch as a function of driver demand and vehicle speed. This results in additional power identified at 154 which, when added to the engine torque, increases the acceleration rate of the vehicle and allows for reduced clutch slip speeds and reduced clutch slip duration. The amount of alternator/starter power commanded is determined by a functional relationship between throttle position and desired power located in a memory lookup table 156.

Figure 8:
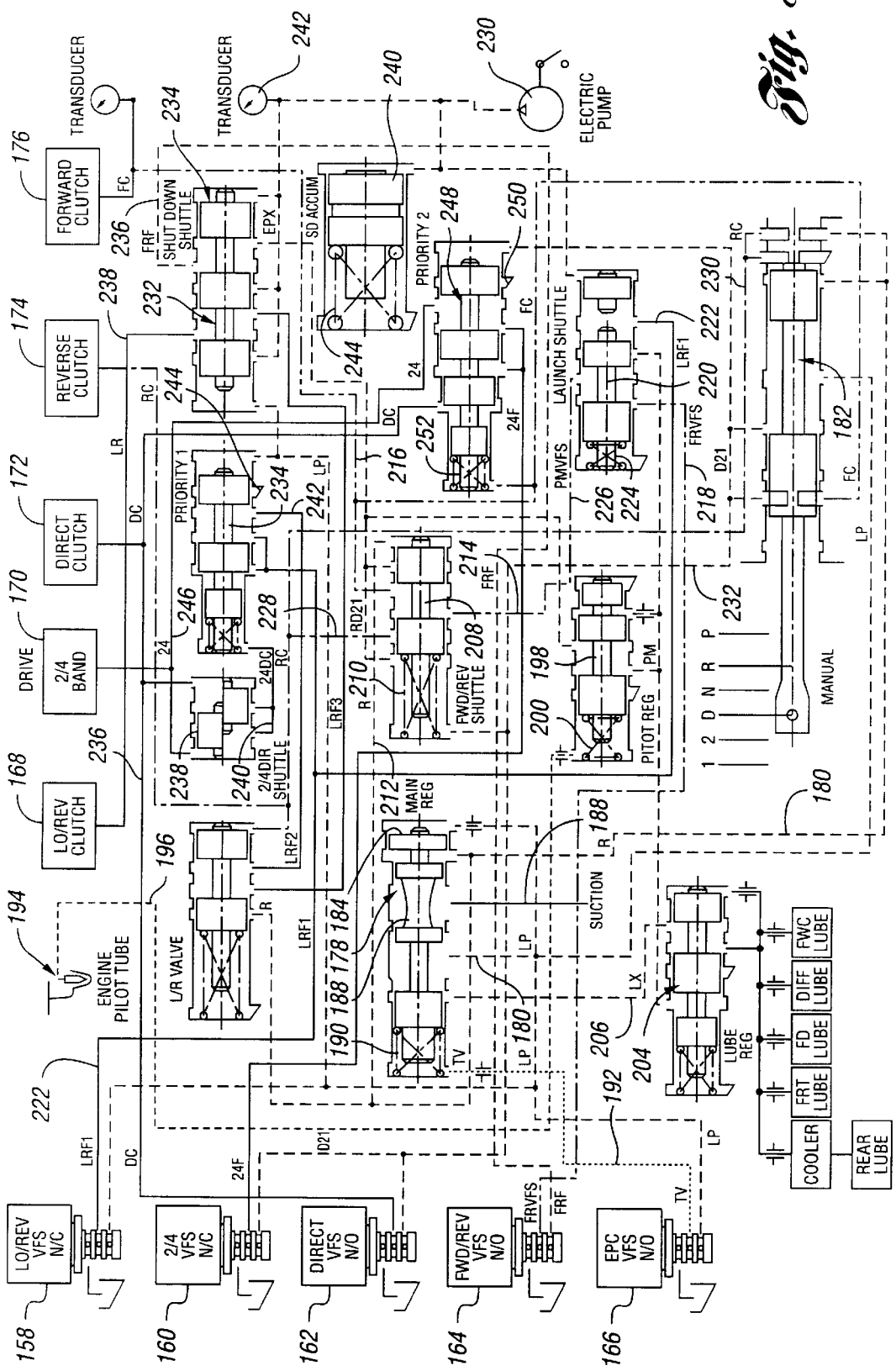
FIGS. 8–11 show a control valve system for a hybrid electric vehicle, the valve elements of FIG. 8 being positioned for drive range, the valves of FIG. 9 being positioned for drive with no electric power assist, the valves of FIG. 10 being positioned for drive with the engine shut down, and the valves of FIG. 11 being positioned for reverse drive.
Figure 9:
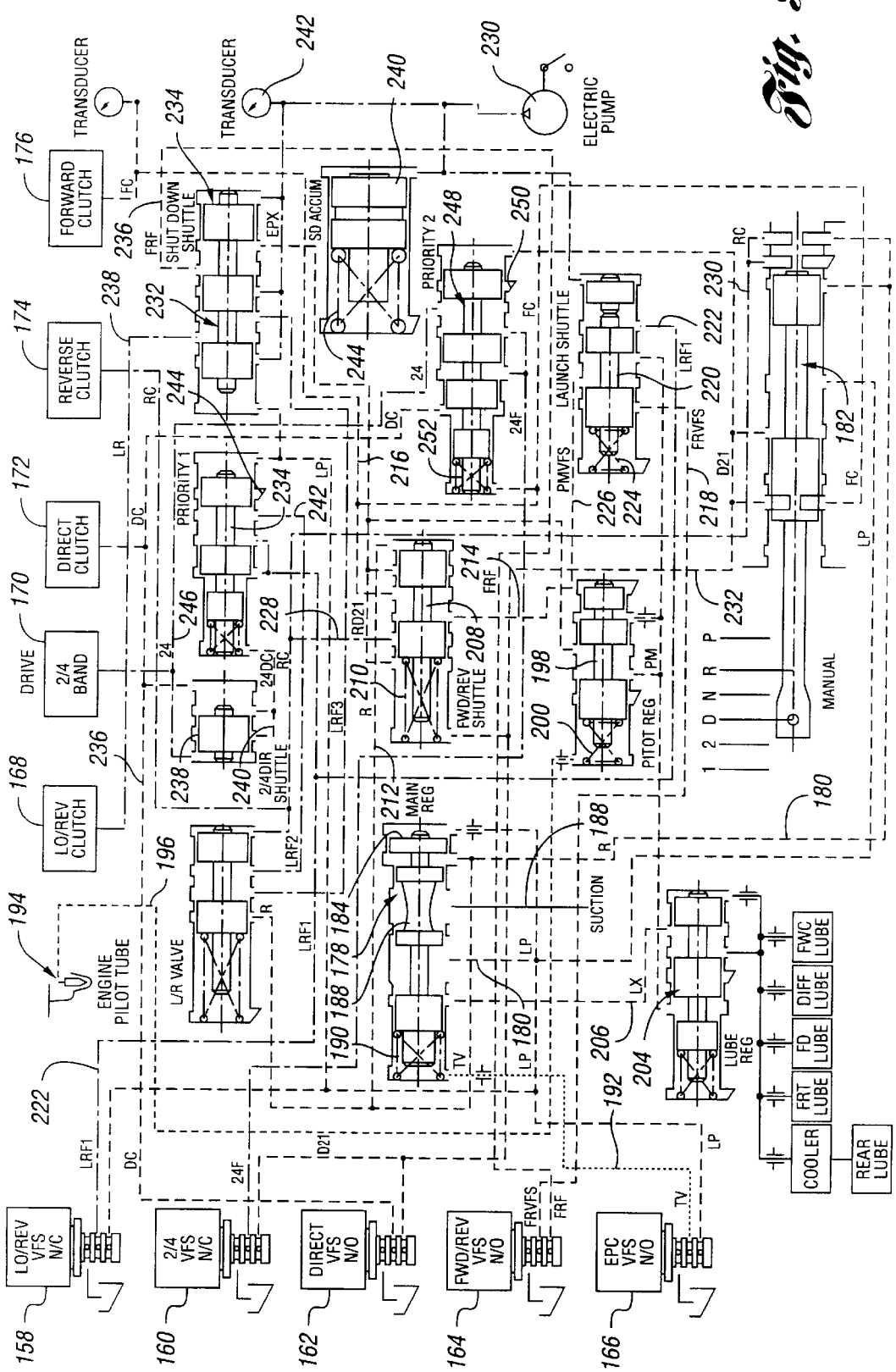
Figure 10:
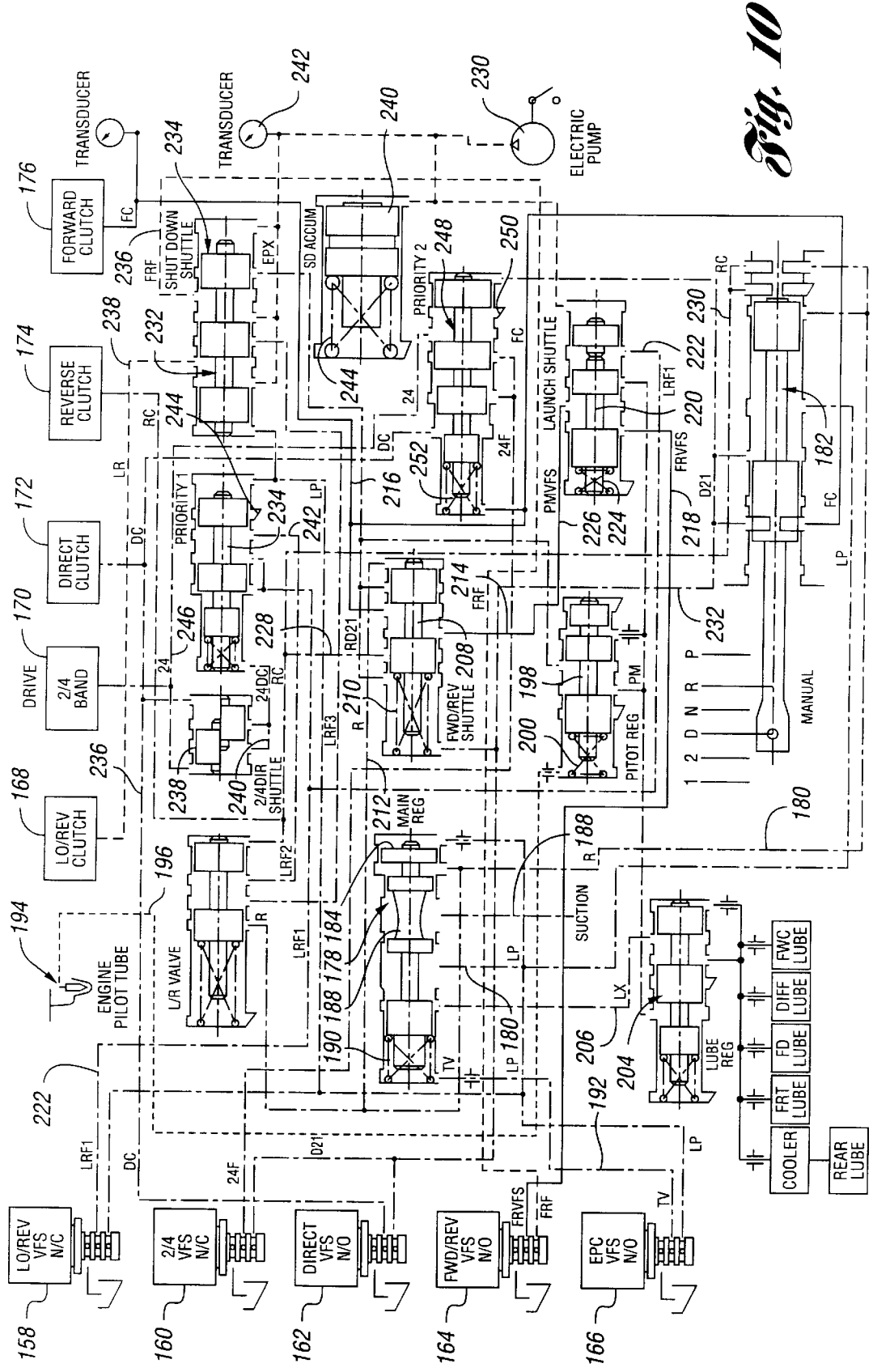
Figure 11:
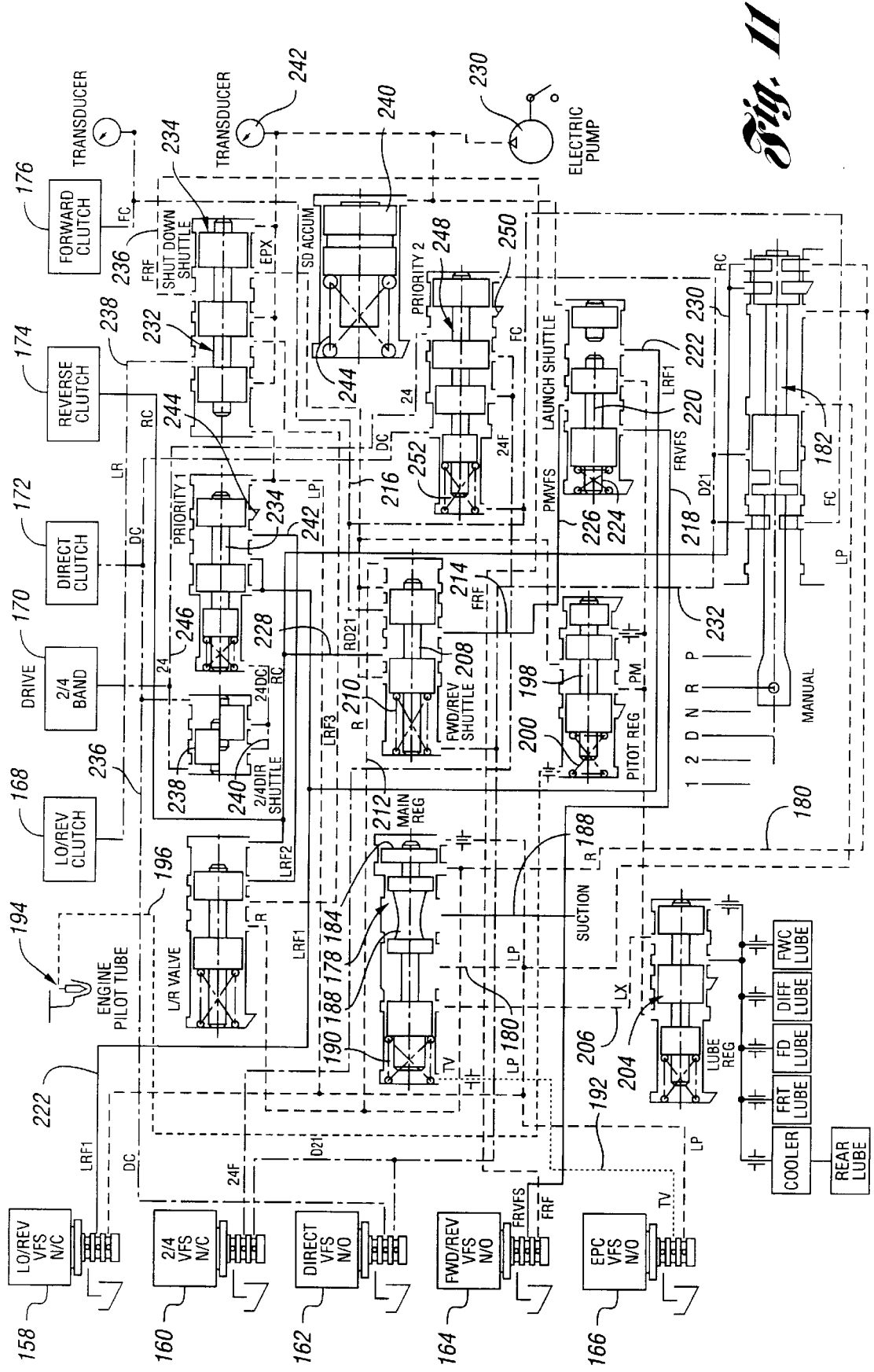

The control system for controlling the transmission clutch for a hybrid vehicle driveline is shown in FIGS. 8–11. FIG. 8 shows the position of the valves of the valve system during operation in the drive range. FIG. 9 shows the same valve system wherein the valve elements are positioned with the transmission range selector in the drive range but wherein electric power is interrupted. FIG. 10 shows the same transmission indicated in FIG. 8 of the manual valve in the drive range position but with the engine shut down. FIG. 11 shows the control valve system with the valve elements in the position they assume when the transmission is in the reverse drive range with the manual valve in the reverse position.

As seen in FIG. 8, the control valve system comprises five variable force solenoids. These are the low-and-reverse variable force solenoid 158, the 2/4 band variable-force solenoid 160, the direct-drive variable-force solenoid 162, the forward-and-reverse variable force solenoid 164, and the electronic pressure-control, variable-force solenoid 166. The symbols used to designate the clutches and brakes in FIG. 2 have been used also to identify these elements in FIGS. 8–11. The reverse-and-low clutch is shown at 168; the 2/4 brake band is shown at 170; the direct clutch (DC)is shown at 172; the reverse clutch (R)is shown at 174; and the forward clutch (FC)is shown at 176.

All of the variable-force solenoids are high-flow solenoids except variable-force solenoid 166. Variable-force solenoids 162, 164 and 166 are normally open. Variable-force solenoids 158 and 160 are normally closed.

A main regulator valve assembly shown at 178 is a line pressure outlet passage 180, which extends to manual valve 182 and to the pressure feedback area 184 on a land formed on a regulator valve spool 186. Supply pressure is distributed to the regulator valve 178 from the engine-driven pump through passage 188.

The force of valve spring 190 on spool 186 is supplemented with throttle valve pressure in passage 192 developed by the variable-force solenoid 166. The feed line for the variable-force solenoid 166 is line pressure passage 180.

An auxiliary pressure is developed by engine pitot tube assembly 94. This comprises a trough filled with lube oil which is connected drivably to a rotary element of the transmission. The lube oil trough receives a pitot tube pickup, which communicates with pitot pressure passage 196 extending to pitot pressure regulator valve 198. Pressure developed by the pitot tube at assembly 194 supplements the force of pitot regulator valve spring 200 to regulate the supply pressure for the pitot regulator valve. Regulated pressure is distributed to the input side of the lube oil regulator valve assembly 204.

The regulator valve assembly 204 is fed with pressurized fluid from the main regulator valve 178 through passage 206. That pressure is modulated to produce a regulated output pressure for the regulator valve 198.

A forward-and-reverse shuttle valve 208 comprises a valve spool that is normally shifted in a right-hand direction by valve spring 210. Reverse line pressure in passage 212 pressurizes the right end of the forward-and-reverse shuttle valve spool 208 to shift it in a left-hand direction against the force of the spring 210 when reverse pressure exists in passage 212. Passage 212 is pressurized when the manual valve 182 is shifted to the reverse position "R". Line pressure in passage 180 supplies regulated pressure from the main regulator valve to the manual valve 182.

The forward-and-reverse shuttle valve connects forward clutch pressure to passage 214. Passage 214 is pressurized with pressure from the forward/reverse variable force solenoid 164, distributed through passage 218. The launch shuttle valve 220 is in the position shown in FIG. 8 when low-and-reverse passage 222 is pressurized with pressure from the low-and-reverse solenoid 158. When the low-and-reverse variable force solenoid has zero pressure, the valve 220 shifts to the right under the force of valve spring 224 as the output pressure of the pitot regulator valve 198 is distributed to passage 226, which can supply forward clutch pressure to passage 216 or reverse clutch pressure to passage 228, depending upon the position of the forward/reverse shuttle valve.

When the engine is shut down and engine transmission pump pressure is not available, pressure can be supplied to the system by electric pump 230, the output of which is distributed to a shutdown shuttle valve 232. When the electric pump is operative, the pressure acting on shuttle valve 234 shifts the valve in a left-hand direction, which allows pressure distribution from the high-pressure side of the pump 230 to forward/reverse feed passage 236. The electric pump pressure is distributed also to the low-and-reverse clutch feed passage 238 through the shutdown shuttle valve.

Variable-force solenoids 158 and 160 are normally "low" pressure solenoids. Solenoids 162, 164 and 166 are normally "high" pressure solenoids. They regulate pressure from zero to about 110 psi.

The shutdown circuit includes a shutdown accumulator 240. A valve piston opposed by an accumulator spring 244 is connected to the output side of the electric pump 230. A pressure transducer 242 and accumulator 240 minimize the time that the electric pump will be required to run during shutdown.

Under normal driving conditions, the low-and-reverse solenoid 158 will be commanded to a minimum pressure, which will move the startup shuttle valve 220 to the left against the force of the spring 224. When electric power is lost, the low-and-reverse solenoid valve will provide zero pressure which will move the shuttle valve 220 to the right because of the force of the spring 224. The pitot modulated pressure in the passage 202 will then feed the forward/reverse shuttle valve, as explained previously. Modulated pitot pressure in passage 214 is controlled by the engine pitot tube assembly 194, which provides a pressure that is a function of the square of the engine speed. This is a so-called "limp home" disconnect.

In neutral mode, neither the forward/reverse variable force solenoid 164 nor the pitot regulator valve 198 is fed. This ensures that there is no neutral creep. A loss of electrical power causes the system then to default to third gear in instances in which a manual valve is in the drive position, and to reverse gear when the manual valve is in the R position.

The output of the pitot regulator valve 198 is fed also to the lubrication regulator valve 204. Since the modulated pitot tube pressure in passage 196 is a function of engine speed, the lube pressure will increase with engine speed. Thus, lube flow will be supplied to the clutch at high engine speed to increase the cooling to the clutches without excessive flow during engine idle speeds.

A system of priority valves is used in the control valve system to prevent tie-up conditions in the transmission gearing. There are six possible tie-up conditions that are prevented. Three of the six tie-up conditions are prevented by the manual valve, which distinguishes between line pressure distributed to the forward clutch and line pressure distributed to the reverse clutch. When the manual valve is in the R position, the clutch pressure is distributed to passage 230, which extends to the reverse clutch 174. At that time, line pressure feed to the forward clutch is interrupted as the manual valve in the D, 2 or 1 positions exhausts through passage 232.

The three other tie-up conditions occur when the direct clutch and the low-and-reverse brake are engaged at the same time. Another tie-up conditions occurs when the low-and-reverse clutch and the 2-4 brake band are applied at the same time. Another tie-up condition occurs when the forward clutch, the direct clutch and the 2-4 brake band are applied at the same time.

To prevent simultaneous application of the direct clutch and the low-and-reverse brake band, priority 1 valve 234 is included in the circuit. If the direct clutch is applied, this energizes the passage 240, which moves priority valve 234 to the right. The low-and-reverse feed passage 242 then is exhausted through exhaust port 244.

A second tie-up condition when the low-and-reverse clutch and the 2-4 brake band are applied is prevented in the same fashion by the priority 1 valve 234. In this instance, however, the 2-4 shuttle valve is moved to the right by 2-4 brake band pressure in passage 246. The low-and-reverse clutch feed passage 242 again is exhausted through exhaust port 244, as explained previously.

Another tie-up condition would exist if the forward clutch, the direct clutch and the 2-4 brake band were to be applied simultaneously. This is prevented by the priority 2 valve 248 as its three differential areas are pressurized. It then will shift in a right-hand direction against the force of pressure in passage 232. Passage 232 is pressurized when the manual valve is in the D position, the 2 position or the 1 position. At that time, passage 246 becomes exhausted through exhaust port 250 in the priority 2 valve 248.

The left-hand end of the priority 2 valve 248 is pressurized by the forward clutch in passage 216. Pressure forces acting on the three differential areas of the priority 2 valve plus the force of the spring 252 are sufficient to shift the valve 248 in a right-hand direction.

To minimize the slip between elements if a clutch control solenoid fails high, line pressure should be maintained at more than 34 psi above the pressure commanded for the oncoming friction element.

The low-and-reverse valve applies line pressure directly to the low-and-reverse clutch during reverse drive rather than the low-and-reverse variable force solenoid output at solenoid 164. This accommodates the increased static torque requirements of the low-and-reverse clutch during reverse operation. By using line pressure in this fashion, the low-and-reverse solenoid 158 can be sized for forward range shifting without compromising the gain requirements for handling reverse torque.

The small electric pump 230 is used to provide up to 40 psi pressure to the engine disconnect clutch, the forward clutch and the low-and-reverse clutches to maintain stroke of friction elements.

The circuits extending to the engine disconnect clutch 16 and the low-and-reverse clutches, as well as the circuit to the forward/reverse variable-force solenoid 164, are interrupted by the shutdown shuttle valve 232. The position of the shutdown shuttle valve is determined by the higher of the line pressure and the electric pump pressure, the line pressure acting on the left side of the shuttle valve and the electric pump pressure acting on the right side of the shuttle valve. Whenever the engine is running, the minimum line pressure is 50 psi while the maximum pressure from the electric pump is 40 psi. The valve then will always allow the main hydraulics to control the clutches even if the electric pump should be turned on. This feature eliminates the need for the electronic control system to control the timing of the shifting of the shutdown shuttle valve in the event of a scheduled final shutdown of the engine.

When the engine is shut down, only first gear operation is possible. When the shutdown shuttle valve is in the shutdown position, the low-and-reverse clutch and the engine disconnect clutch are fed directly with the electric pump.

Since the forward clutch circuit is fed by the variable-force solenoid regulator, its capacity can be controlled so that the load on the engine at restart is a minimum. The auxiliary pump 230 will keep the first gear friction elements filled so that when the engine restarts and the main hydraulic system is pressurized, there will be minimum delay in developing a torque flow path to the vehicle wheels.

FIG. 12 shows an alternative design for ensuring that engine torque can be delivered to the vehicle wheels following engine shutdown when the vehicle operator moves the open throttle toward the wide-open throttle position during startup. In the schematic representation of FIG. 12, the clutch includes an annular cylinder 260 which receives an annular piston 262. The cylinder may be connected to the engine crankshaft and it may carry driving clutch discs 264 of a multiple-disc clutch pack. The driven discs 266 of the multiple-disc clutch pack can be connected to torque input element of the gearing. The clutch normally is applied by clutch-apply springs 268. Clutch-apply pressure can be distributed through the pressure chamber 270 defined by the cylinder and the piston.

Release pressure chamber 272 is situated on the side of the piston 262 opposite the pressure chamber 270. Release pressure is applied to the release pressure chamber 272 to release the clutch when apply pressure is absent from the pressure chamber 270.

Figure 17:
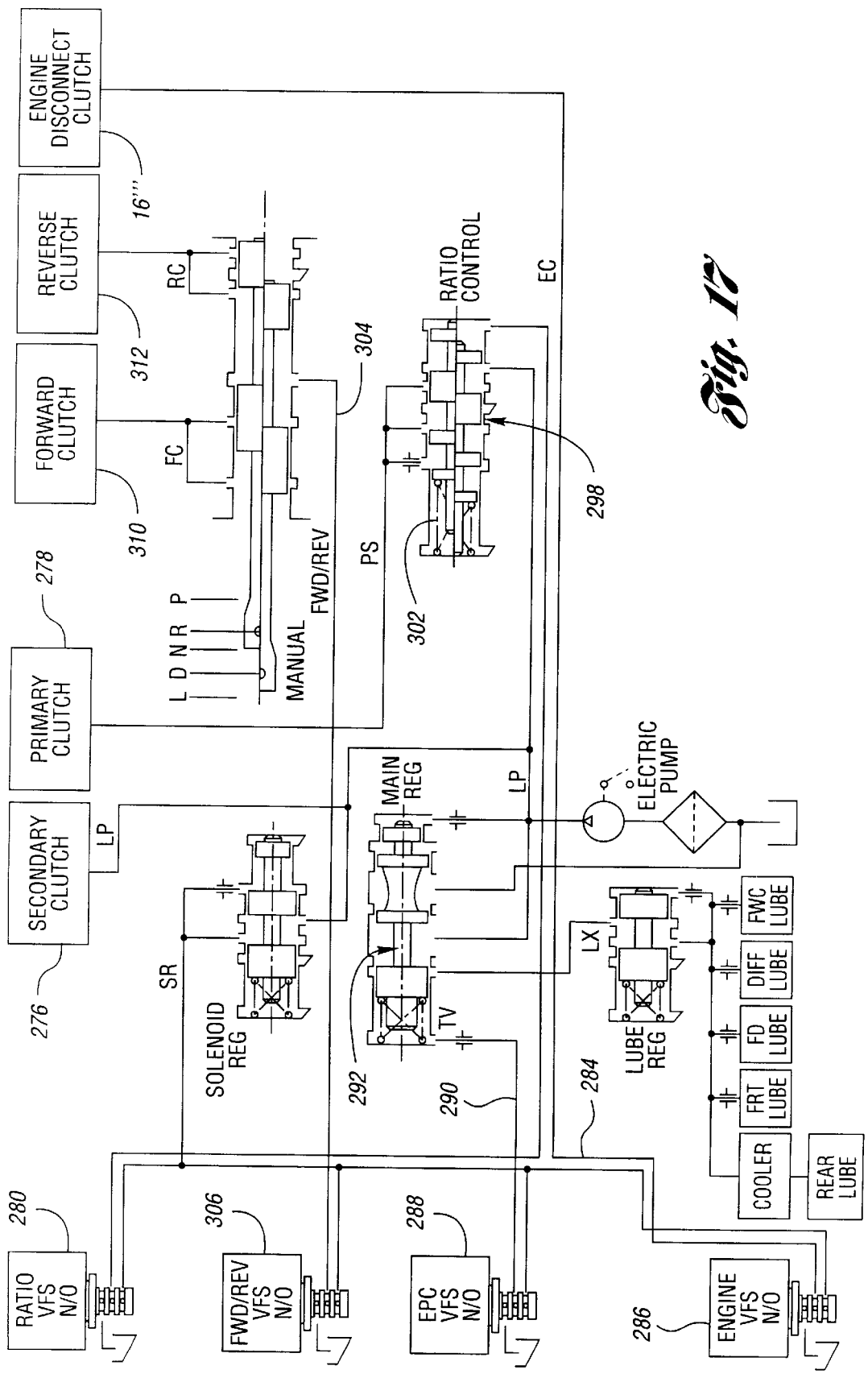
FIG. 17 is a schematic valve diagram for controlling the sheaves and the clutches of a continuously variable transmission in the driveline configuration for a hybrid vehicle shown in FIG. 16.

FIG. 16 shows a hybrid vehicle design configuration that uses a continuously variable transmission. FIG. 17 shows a control valve system that may be used with the transmission shown at 12''' in FIG. 16.

If it is assumed that the continuously variable transmission includes a primary sheave and a secondary sheave of the kind shown in the previously identified Tibbles et al patent, the torque output of the transmission is represented by the secondary sheave symbol 276, and the input side of the continuously variable transmission can be represented by the primary sheave symbol 278. A ratio-control, variable-force solenoid 280 supplies ratio control pressure to passage 282 and is supplied with line pressure from feed passage 284, which is connected to the output side of the engine variable-force solenoid 286.

The electronic pressure control variable-force solenoid 288 supplies torque-sensitive pressure or throttle pressure (TV Pressure) through passage 290 to main regulator valve 292. An electric pump 294 can be used to supply line pressure to ratio-control feed passage 296, which extends to the ratio control valve 298.

The ratio control valve distributes primary sheave pressure through passage 300 to the primary sheave 278 as low pressure is distributed to the secondary sheave 276 to passage 296.

The ratio control valve is controlled by the pressure in passage 282, which develops a pressure on the ratio control valve that opposes the force of spring 302.

Engine disconnect clutch 16''' is controlled by the engine variable-force solenoid 286. Forward-and-reverse clutch pressure is distributed through passage 304 from the forward-and-reverse variable force solenoid 306. The manual valve 308 distributes pressure from passage 304 to the forward clutch 310 or the reverse clutch 312.

The two power sources for the embodiment of FIGS. 16 and 17 are the internal combustion engine and the electric induction motor 14'''. The engine disconnect clutch 16''' connects the induction motor 14''' to the engine 10'''. When the disconnect clutch is off, the engine can be shut down to conserve fuel. To restart the engine, the disconnect clutch is engaged so that the starter/alternator will crank the engine.

As in the case of the previously described design configurations, the continuously variable transmission configuration operates without a torque converter. The slip of the reverse and forward clutches 310 and 312 is controlled during idle and launch. This also controls driveline damping.

Driveline torque disturbances are minimized with the continuously variable transmission configuration because it does not have shift transients, as in the case of a step ratio transmission. This tends to overcome the disadvantage of the absence of a torque converter to dampen torque disturbances. The continuously variable transmission configuration can provide regenerative braking in coast mode.

During launch, the engine may be shut down and the entire launch torque can be obtained with electric motor. In that instance, the forward clutch would be fully locked.

Alternatively, the engine can be kept running and the forward clutch may be allowed to slip using an electronic controller. The motor can then be used to assist the launch to provide optimum launch performance.

Driveline torsional vibrations can be dealt with using the starter/alternator with an electronic microprocessor, or the processor can provide a small slip (e.g., 20 rpm) across the forward clutch so that engine torsional disturbances are not transmitted through the transmission. The clutches in this instance will be required to handle torque even when the engine is off, and the launch can be done with the electric motor. Since the electric motor provides torque at zero speed, the transmission clutches must be designed to handle this torque. The pump, therefore, must be driven electrically.

Although embodiments of the invention have been described, modifications may be made by persons skilled in the art without departing from the scope of the invention. All such modifications and all equivalents thereof are within the scope of the following claims.

What is claimed is:

1. A hybrid vehicle powertrain comprising an internal combustion engine, a multiple-ratio power transmission mechanism, and an electric motor;

the transmission mechanism having multiple-ratio gearing and clutch and brake means for establishing and disestablishing multiple torque flow paths through the gearing;

the clutch and brake means including a controllable, pressure-actuated friction clutch in a torque flow path between the engine and torque input elements of the gearing;

a torque input shaft of the transmission mechanism being connected to the engine through the friction clutch;

the electric motor being drivably connected to the torque input shaft in parallel disposition with respect to the engine whereby each is capable of delivering driving torque to the torque input shaft;

the motor thereby forming a source of driving torque that complements driving torque of the engine when the engine is activated and forming a sole source of driving torque when the engine is deactivated;

means for controlling electronic engagement of the friction clutch during engine idle comprising means for detecting engine torque and determining a torque signal indicative of an idle torque offset from the engine torque; and means for combining engine torque during idle with electric motor torque and for maintaining a regulated clutch actuating pressure responsive to the torque signal whereby engine idle torque variations are modified during engine idle by electric motor torque to effect electronic damping of engine torque during engine idle.

2. A hybrid vehicle powertrain comprising a throttle controlled internal combustion engine, a multiple-ratio power transmission and an electric motor;

the transmission having multiple-ratio gearing and clutch and brake means for establishing and disestablishing multiple torque flow paths through the gearing;

a friction clutch;

a torque input member of the transmission being connected directly to the engine through the clutch; and an electric motor drivably connected to the torque input member in parallel disposition with respect to the engine whereby each is capable of delivering driving torque to the torque input member;

the friction clutch, when it is disengaged, interrupting torque delivery from the engine to the torque input member;

the motor forming a source of driving torque that complements driving torque of the engine when the friction clutch is engaged and forming a source of torque independent of the engine when the friction clutch is disengaged;

means for combining electric motor torque with engine torque during launch of the vehicle including means for computing vehicle speed during launch as a function of clutch gain;

means for detecting actual vehicle speed and engine throttle position during launch;

an electronic controller including a stored functional relationship between throttle position and actual vehicle speed to determine desired power from the electric motor;

means for determining a target engine speed as a function of throttle position and computed vehicle speed; and means for controlling friction clutch gain as a function of the error between target engine speed and actual engine speed whereby a smooth vehicle launch is accomplished.

3. The hybrid vehicle powertrain set forth in claim 1 wherein the clutch and brake means includes an engine disconnect clutch that establishes and disestablishes a torque flow path between the engine and the multiple-ratio gearing.

4. The hybrid vehicle powertrain set forth in claim 2 wherein the gearing, upon reverse torque delivery therethrough during coasting, drives the electric motor to effect regenerative braking that converts kinetic energy in the powertrain to electrical voltage energy.

5. The hybrid vehicle powertrain set forth in claim 1 wherein the clutch and brake means include hydraulic pressure actuators including movable actuator pistons that are stroked from a clutch and brake release position to a clutch and brake apply position;

the transmission mechanism having an engine-driven fluid pressure pump and a control valve circuit means for selectively supplying actuating fluid pressure from the engine-driven pump to the hydraulic pressure actuators; and an auxiliary pump with a driving torque source independent of the engine-driven pump, said control valve circuit including passage structure connecting the auxiliary pump to the hydraulic pressure actuators when the engine is inactive thereby maintaining a threshold pressure in the hydraulic pressure actuators.

6. The hybrid vehicle powertrain as set forth in claim 2 wherein the torque flow paths include a separate clutch located between the engine and the electric motor.

7. The hybrid vehicle powertrain set forth in claim 5 wherein the control valve circuit comprises solenoid-operated valve means for controlling pressure distribution to the pressure actuators, and a pitot pressure generator comprising a pitot pickup element and a body of fluid forming a part of the valve circuit, the body of fluid and the pitot pickup element being relatively rotatable, one with respect to the other, at a speed proportional to engine speed;

and means for distributing velocity pressure from the pitot pickup element to the control circuit whereby the pitot pressure generator applies circuit pressure to the valve circuit to replace transmission engine-driven pump pressure when the solenoid-operated valve means are nonfunctional.

8. A hybrid vehicle powertrain comprising an internal combustion engine, a power transmission and an electric motor;

a friction clutch;

a torque input member of the transmission being connected to the engine through the clutch;

the electric motor being drivably connected to the torque input member in parallel disposition with respect to the engine whereby each is capable of delivering driving torque to the torque input member;

the clutch, when it is disengaged, interrupting torque delivery from the engine to the torque input member;

the motor forming a source of driving torque that complements driving torque of the engine when the clutch is engaged and forming a source of torque independent of the engine when the friction clutch is disengaged;

the clutch comprising driving and driven clutch discs in a disc assembly and a clutch piston actuator for applying a clutch disc engaging force to the disc assembly;

a fluid pressure clutch chamber defined in part by the clutch piston actuator;

the clutch chamber, when pressurized, creating a clutch disc engaging force on the clutch piston actuator; and a clutch spring acting on the clutch piston actuator thereby creating a threshold clutch disc engaging force that creates a reduced delay in establishing clutch torque capacity as clutch piston actuator pressure is distributed to the clutch chamber.

9. The hybrid vehicle powertrain set forth in claim 5 wherein control valve circuit means includes priority valve elements disposed between the engine-driven pump and the hydraulic pressure actuators; and means for activating the priority valve elements to effect pressure distribution to first ones of the hydraulic pressure actuators that establish torque flow paths in the gearing for power delivery with a first torque ratio while preventing pressure distribution to second ones of the pressure actuators for power delivery with a second torque ratio.

10. A hybrid vehicle powertrain comprising an internal combustion engine, a multiple-ratio power transmission mechanism, and an electric motor;

the transmission mechanism having multiple-ratio gearing and clutch and brake means for establishing and disestablishing multiple torque flow paths through the gearing;

the clutch and brake means including a controllable, pressure-actuated friction clutch in a torque flow path between the engine and torque input elements of the gearing;

a torque input shaft of the transmission mechanism being connected to the engine through the friction clutch;

the electric motor being drivably connected to the torque input shaft in parallel disposition with respect to the engine whereby each is capable of delivering driving torque to the torque input shaft;

the motor thereby forming a source of driving torque that complements driving torque of the engine when the engine is activated and forming a sole source of driving torque when the engine is deactivated;

means for controlling electronic engagement of the friction clutch during engine idle comprising means for detecting engine torque and determining a torque signal indicative of engine idle torque;

means for combining engine torque during idle with electric motor torque and for maintaining a regulated clutch actuating pressure responsive to the torque signal whereby engine idle torque variations are modified during engine idle by electric motor torque to effect electronic damping of engine torque during engine idle;

means for combining electric motor torque with engine torque during launch of the vehicle including means for computing vehicle speed during launch as a function of friction clutch gain;

means for detecting actual vehicle speed and engine throttle position during launch;

an electronic controller including a stored functional relationship between throttle position and actual vehicle speed to determine desired power from the electric motor;

means for determining a target engine speed as a function of throttle position and computed vehicle speed; and means for controlling clutch gain as a function of the error between target engine speed and actual engine speed whereby a smooth vehicle launch is accomplished.

\* \* \* \* \*